(12) United States Patent
Fesler et al.

(10) Patent No.: US 9,862,329 B2
(45) Date of Patent: Jan. 9, 2018

(54) METHODS AND APPARATUS FOR ARTICULATING STORAGE SYSTEM

(71) Applicant: Fesler Holdings, LLC, Scottsdale, AZ (US)

(72) Inventors: Christopher Fesler, Phoenix, AZ (US); Christopher Cowen, Mesa, AZ (US)

(73) Assignee: Fesler Holdings, LLC, Scottsdale, AZ (US)

( * ) Notice: Subject to any disclaimer, the term of this patent is extended or adjusted under 35 U.S.C. 154(b) by 0 days.

(21) Appl. No.: 15/440,778

(22) Filed: Feb. 23, 2017

(65) Prior Publication Data

US 2017/0240117 A1  Aug. 24, 2017

Related U.S. Application Data

(60) Provisional application No. 62/298,550, filed on Feb. 23, 2016.

(51) Int. Cl.
| | | |
|---|---|---|
| *B60R 7/14* | (2006.01) | |
| *B60R 7/06* | (2006.01) | |
| *B60R 7/04* | (2006.01) | |
| *F41C 33/02* | (2006.01) | |
| *F41C 33/04* | (2006.01) | |
| *G06K 9/00* | (2006.01) | |

(52) U.S. Cl.
CPC ............... *B60R 7/14* (2013.01); *B60R 7/046* (2013.01); *B60R 7/06* (2013.01); *F41C 33/0236* (2013.01); *F41C 33/045* (2013.01); *G06K 9/00013* (2013.01); *G06K 9/00087* (2013.01)

(58) Field of Classification Search
CPC ... B60R 7/14; B60R 7/046; B60R 7/06; F41C 33/0236; F41C 33/045
See application file for complete search history.

(56) References Cited

U.S. PATENT DOCUMENTS

| | | | | |
|---|---|---|---|---|
| 4,560,134 | A * | 12/1985 | Klein | B60R 7/14 224/913 |
| 4,936,531 | A * | 6/1990 | Bauser | B60N 3/00 211/64 |
| 5,193,725 | A * | 3/1993 | Radocy | A45F 5/14 224/197 |
| 5,421,497 | A * | 6/1995 | Gilmore | A45F 5/00 224/192 |
| 6,382,484 | B1 * | 5/2002 | Savant | B60R 7/14 224/282 |
| 2002/0170934 | A1 * | 11/2002 | Haspel | A45F 5/02 224/197 |
| 2003/0090116 | A1 * | 5/2003 | Radstake | B60R 7/04 296/37.7 |

* cited by examiner

*Primary Examiner* — Corey Skurdal
(74) *Attorney, Agent, or Firm* — The Noblitt Group, PLLC

(57) ABSTRACT

Apparatus and methods according to various aspects of the present technology may comprise a housing connected to one or more articulating arms. The housing may have a receiving section, such as a holster, for receiving an item for storage. The articulating arms may position the housing in a concealed location and then on command reposition the housing in a more readily accessible location so that the item may be retrieved.

20 Claims, 8 Drawing Sheets

METHODS AND APPARATUS FOR ARTICULATING STORAGE SYSTEM

CROSS-REFERENCES TO RELATED APPLICATIONS

This application claims the benefit of U.S. Provisional Patent Application No. 62/298,550, filed Feb. 23, 2016, and incorporates the disclosure of the application by reference.

BACKGROUND OF THE TECHNOLOGY

Many people choose to carry protection devices for personal security and self-defense. The type of device chosen depends on a person's preference and some types may be more easily concealed than others. Often, people that choose to carry personal defense devices carry them concealed on their person. However, there are times when carrying a personal defense device may not be practical such as when visiting a private business that does not allow firearms. In such circumstances, the person carrying the personal defense device must decide to either violate the rules or the law or leave their personal defense device behind in their vehicle. Leaving the personal defense device behind may pose a concern since it may result in a personal defense device such as handgun being left behind in a vehicle where it might be stolen. Other times people choose to keep a personal defense device in their vehicle so that it is within reach should it be required.

In each circumstance, there is a concern that the personal defense device may be vulnerable to theft if it is left somewhere easily accessible such as a glove box or the center console of a vehicle. To reduce this possibility, the personal defense device may be stored somewhere more difficult to locate or find. However, a drawback of this approach is that the personal defense device may not be readily available in the event of an emergency.

SUMMARY OF THE TECHNOLOGY

Apparatus and methods according to various aspects of the present technology may comprise an articulating storage device. The articulating storage device may comprise a housing connected to one or more articulating arms. The housing may have a receiving section, such as a holster, for receiving a device for storage. The one or more articulating arms may position the housing in a concealed location and then on a user's command, reposition the housing in a more readily accessible location so that the user may retrieve the device..

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various motors, couplings, storage devices, dimensions, and geometries, which may carry out a variety of operations suited to a specified installation, application, or environment. In addition, the present technology may be practiced in conjunction with any number of systems configured for articulating concealment of devices, and the system described is merely one exemplary application for the technology. Further, the present technology may employ any number of conventional techniques for storage, articulation, concealment, and the like.

Methods and apparatus for an articulating storage system according to various aspects of the present technology may operate in conjunction with any container, holder, holster, and/or like device used to safely house a firearm. Various representative implementations of the present technology may be applied to any system or device that may be used for any items that may require concealment and ease of access to the user.

Figure 1:
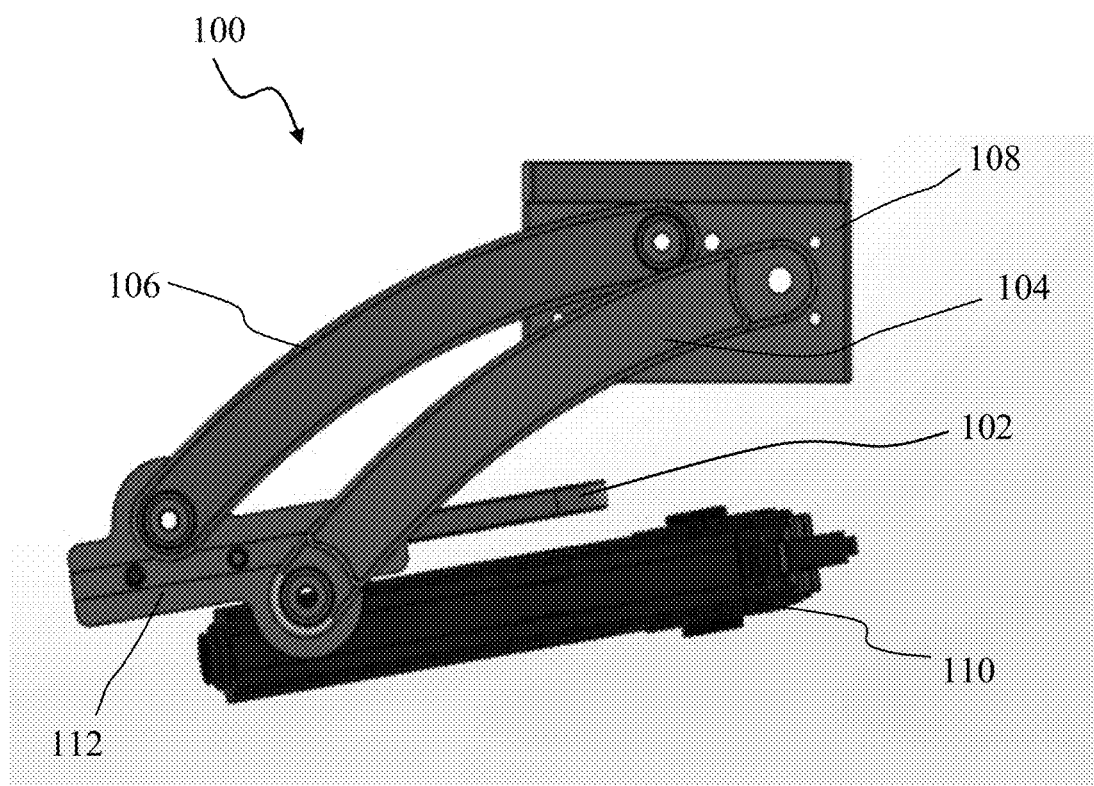
FIG. 1 representatively illustrates an articulating storage device in accordance with an exemplary embodiment of the present technology.

Referring to FIG. 1, an articulating storage system 100 may comprise a housing 102 connected to a first end of at least one articulating arm 104, 106. A second end of the at least one articulating arm 104, 106 may be coupled to a mounting bracket 108 suitably configured to be connected in a substantially hidden position. The articulating storage system 100 may be suitably configured to rotate, translate, shift, or otherwise move a device 110 from a first hidden or hard to access position such as behind or under a dashboard, behind a panel, under a seat, deep in a car trunk, or any other like place of concealment that is generally out of view, to a second readily accessible position.

The device 110 may comprise any object that the user wishes to store or that may be suitably configured to be stored within, coupled to, inserted, or otherwise connected to the housing 102. For example, in one embodiment, the device 110 may comprise personal protection device such as a handgun, knife, rifle, electroshock weapon, or the like. In an alternative embodiment, the device 110 may comprise other objects such as a wallet, mobile telecommunication device, portable computing device, keys, or any other like object that the user may wish to store in a concealed location or that is otherwise generally out of the plain view of others.

Figure 2:
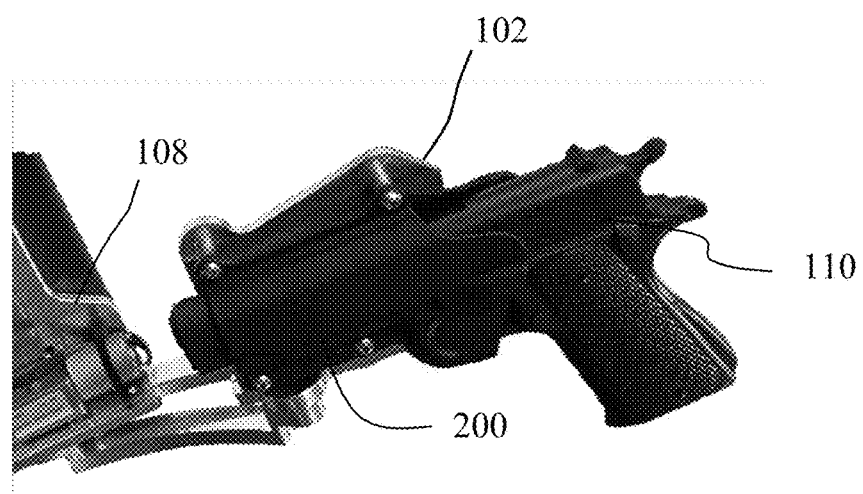
FIG. 2 representatively illustrates a holster attached to the articulating storage device in accordance with an exemplary embodiment of the present technology.

Referring now to FIGS. 1 and 2, the housing 102 may be configured to hold the device 110 that the user wishes to store in the concealed location. The housing 102 may comprise any suitable apparatus or system that may receive the device 110. For example, in one embodiment the housing 102 may comprise a holster 200 configured to receive at least a portion of a handgun in a similar manner as a typical holster that encloses a forward portion of the handgun but leaves a grip portion generally open and accessible to the user. In an alternative embodiment, the housing 102 may comprise a compartment having an internal volume for holding items.

The housing 102 may further comprise security features configured to securely lock the device 110 in place when the housing is in the first position. For example, the holster 200 may comprise a locking element (not shown) suitably configured to clamp around a portion of the handgun to prevent the barrel from being withdrawn from the housing 102 when the housing 102 is in the first position. Alternatively, or in addition to, the locking element may be configured to prevent the handgun from being used when the housing 102 is in the first position. For example, an internal surface of the housing 102 may comprise a trigger lock (not shown) that is suitably configured to engage the trigger of the handgun and prevent the trigger from moving a sufficient amount to cause the handgun to fire.

Figure 7A:
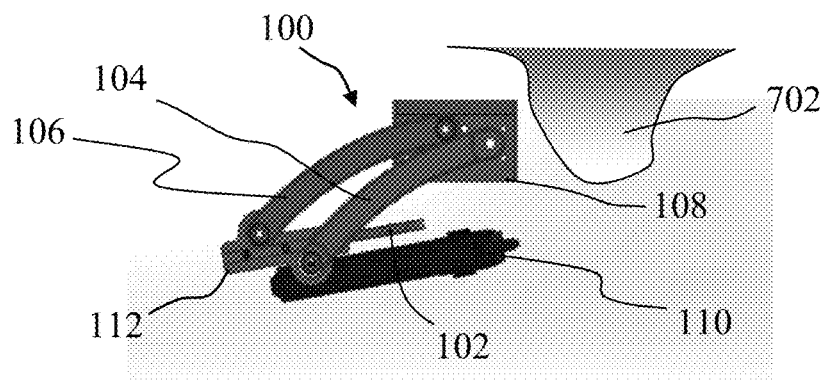
FIG. 7A representatively illustrates an articulating storage device in a stowed position in accordance with an exemplary embodiment of the present technology.
Figure 7B:
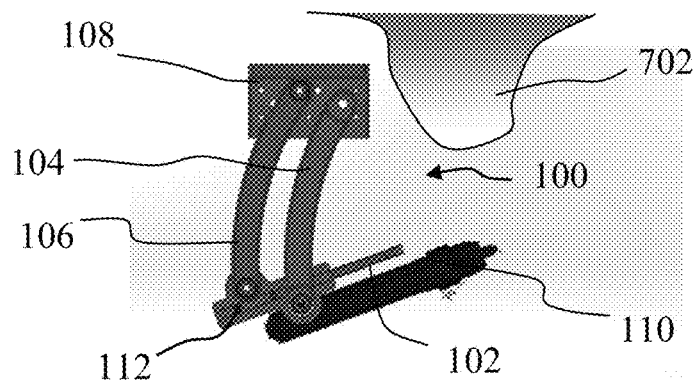
FIG. 7B representatively illustrates the articulating storage device in a mid-transition stage in accordance with an exemplary embodiment of the present technology.

An articulating bracket 112 may be coupled to the housing 102 and be suitably configured to provide pivotable mounting locations for the at least one articulating arm 104, 106. The pivotable mounting locations may be located on the articulating bracket 112 such that the housing 102 is allowed to rotate or translate at a different rate than the at least one articulating arm 104, 106. For example, and referring now to FIGS. 7A-7C and 8, in one embodiment the articulating bracket 112 may comprise a plate having a first pivot point 802 positioned on one side of a center line 806 of the plate and a second pivot point 804 positioned on the other side of the center line 806. A first articulating arm 104 may be pivotally coupled to the first pivot point 802 and a second articulating arm 106 may be pivotally coupled to the second pivot point 804. When the articulating storage system 100 is in a first position (FIG. 7A), the housing 102 may be concealed and have a first orientation relative to the first and second articulating arms 104, 106. As the first and second articulating arms 104, 106 move from the first position towards the second position, the orientation of the housing 102 relative to the first and second articulating arms 104, 106 may change becoming less acute (FIG. 7B). Finally, when the first and second articulating arms 104, 106 have moved fully to the second (unconcealed) position, the orientation between the housing 102 and the first and second articulating arms 104, 106 is obtuse and the device 110 is a more readily accessible position.

Referring now to FIGS. 4A, 4B, 5, 6, and 14, in an alternative embodiment, articulating bracket 112 may comprise a body having a set of mounting holes along a first body member 1404 and the first and second pivot points 802, 804 positioned along a second body member 1406 set at an angle relative to the first body member 1404. The angle between the first body member 1404 and the second body member 1406 may comprise any suitable value and may be determined according to the necessary orientation of the housing 102 when in the first position and the desired orientation of the housing 102 when in the second position.

The positioning of the first and second pivot points 802, 804 may be determined according to any suitable criteria such as the type of structure being used to conceal the housing 102, the geometry required to move the housing 102 from the concealed location to an accessible location, the type of device 110 being concealed, and the like. For example, the first and second pivot points 802, 804 maybe aligned along an axis or offset from each other. A distance between the first and second pivot points 802, 804 may also comprise any suitable value and may be determined according to a desired amount of rotation of the housing 102 as the first and second articulating arms 104, 106 move from the first position to the second position.

The at least one articulating arm 104, 106 are configured to move the housing 102 between the first position and the second position. The at least one articulating arm 104, 106 may comprise any suitable system or device for moving the housing 102 from the concealed position to the accessible position and back to the concealed position. In one embodiment, the at least one articulating arm 104, 106 comprises a pair of arms coupled at a first end to the mounting bracket 108 and the articulating bracket 112 on a second end. Each articulating arm 104, 106 from the pair of arms may be appropriately configured such that the housing 102 is properly oriented in the first and second positions to effect both concealment and access according to the respective position of the housing 102. For example, referring now to FIG. 5, in one embodiment, the pair of arms may comprise substantially identically shaped members.

Figure 9:
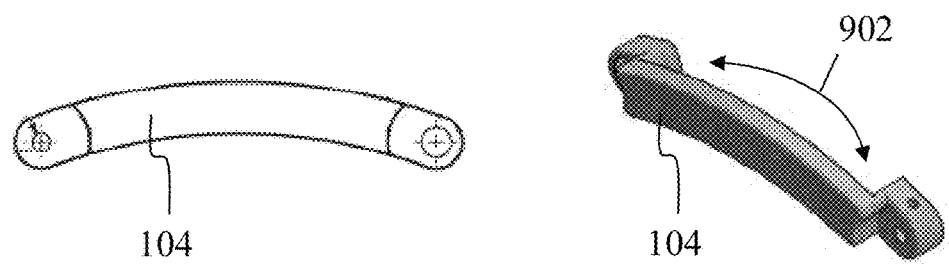
FIG. 9 representatively illustrates side and perspective views of a first articulating arm in accordance with an exemplary embodiment of the present technology.
Figure 10:
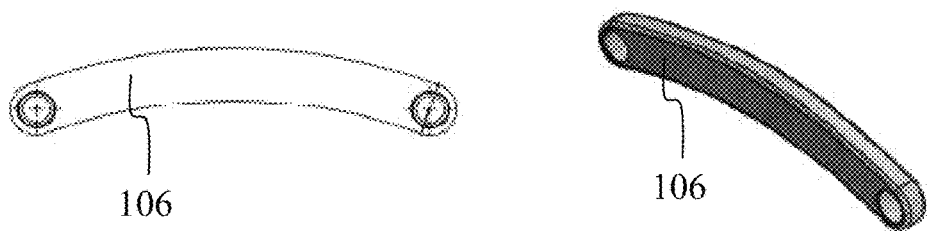
FIG. 10 representatively illustrates side and perspective views of a second articulating arm in accordance with an exemplary embodiment of the present technology.
Figure 11:
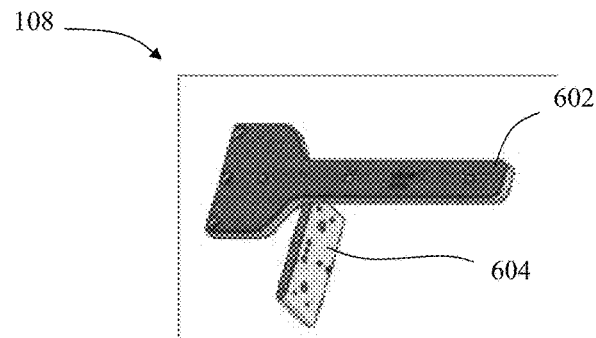
FIG. 11 representatively illustrates an exploded view of a mounting bracket in accordance with an exemplary embodiment of the present technology.
Figure 12:
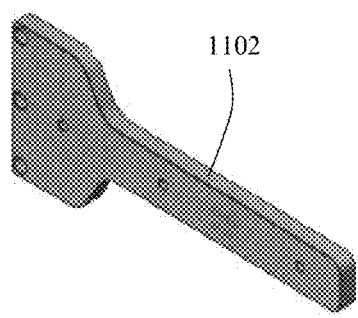
FIG. 12 representatively illustrates a perspective view of a horizontal frame member of the mounting bracket in accordance with an exemplary embodiment of the present technology.
Figure 13:
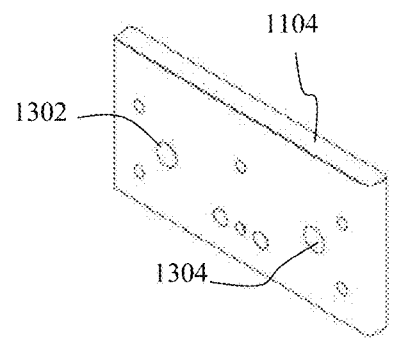
FIG. 13 representatively illustrates a perspective view of a vertical wall member of the mounting bracket in accordance with an exemplary embodiment of the present technology.
Figure 14:
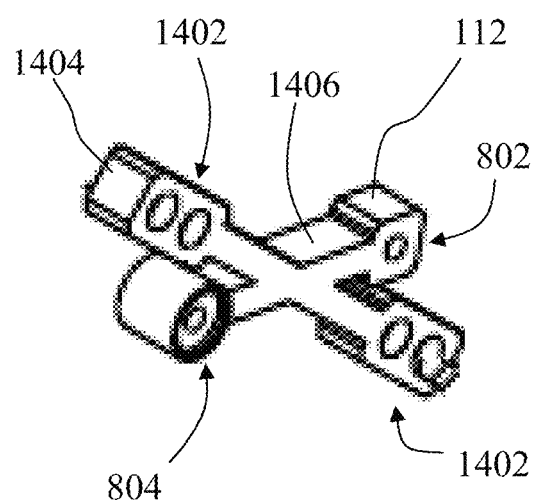
FIG. 14 representatively illustrates a perspective view of an alternate embodiment of articulating bracket in accordance with an exemplary embodiment of the present technology.

In an alternative embodiment, each articulating arm 104, 106 may comprise a different shape that is determined according to the desired geometrical movement of the housing 102 between the first and second positions. For example, referring now to FIGS. 9 and 10, a first articulating arm 104 may comprise an arm member having right-angled leg attachment sections configured to create a gap 902 extending between the two leg attachment sections. The gap 902 may be configured to allow at least a portion of the second articulating arm 106 to pass when the first articulating arm 104 and the second articulating arm 106 translate from the first position to the second position.

Each articulating arm 104, 106 may further comprise any suitable number of segments. For example, in one embodiment, each articulating arm 104, 106 may comprise a one-piece structure having coupling points at one end or both ends. In an alternative embodiment, each articulating arm 104, 106 may comprise more than one segment, wherein each segment may be configured to rotate, translate, or otherwise move independently from at least one other segment. Multiple segments may allow for more complex movements between the first and second position which may allow the housing 102 to be located in less easily accessible locations.

The at least one articulating arm 104, 106 may also be configured to move from the first position to the second position by any suitable method. For example, in one embodiment, each articulating arm 104, 106 may be configured to rotate about the end of the articulating arm that is connected to the mounting bracket 108. In an alternative embodiment, each articulating arm 104, 106 may be configured to slide or roll along a track. In yet a third embodiment, the mounting bracket 108 may comprise one or more slots suitably configured to allow a given articulating arm 104, 106 to at least partially move and/or rotate relative to a fixed position of the mounting bracket 108 itself.

The at least one articulating arm 104, 106 may comprise any suitable material capable of supporting the weight of the housing 102 and the device 100 such as various types of metals or metal alloys, composites, plastics, polymers, woods, and the like. For example, in one embodiment, the at least one articulating arm 104, 106 may comprise aluminum.

Figure 3:
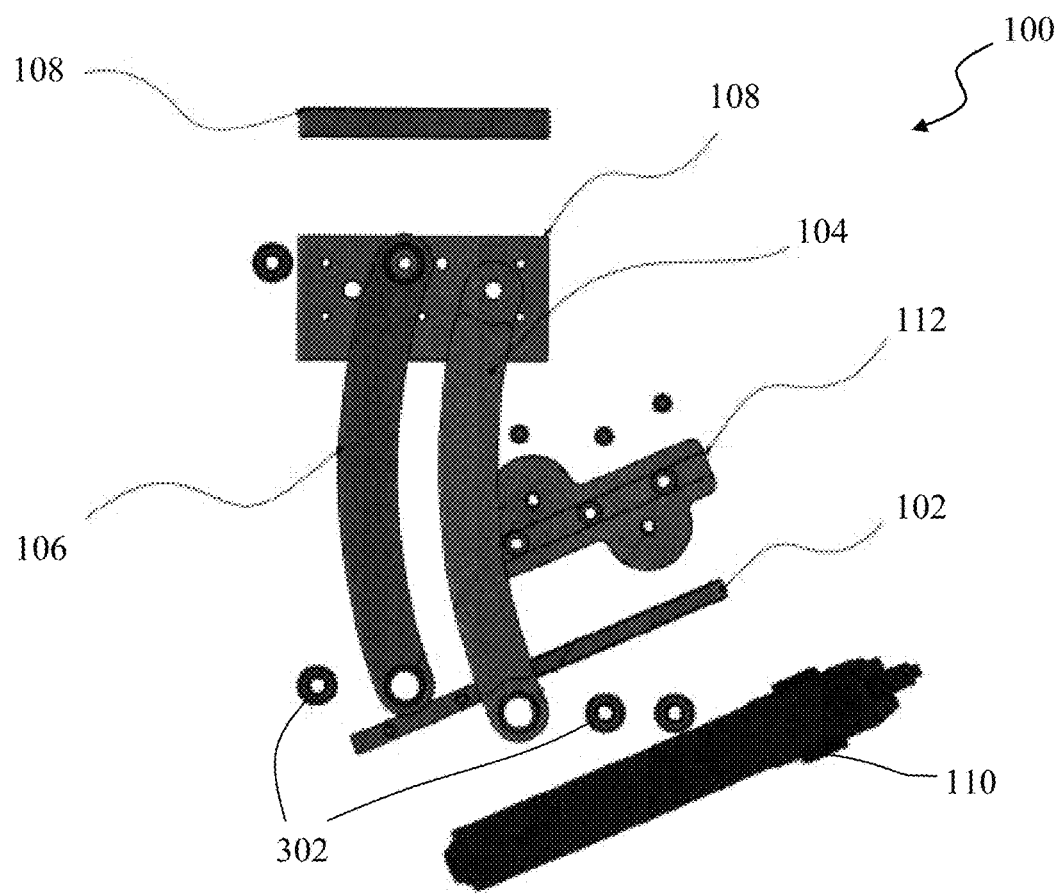
FIG. 3 representatively illustrates an exploded view of the articulating storage device in accordance with an exemplary embodiment of the present technology.

Rotation of the at least one articulating arm 104, 106 may be accomplished by any suitable device or mechanism. For example, referring now to FIGS. 3 and 6, in one embodiment, the at least one articulating arm 104, 106 may be connected to the pivot points of the mounting bracket 108 or the articulating bracket 112 by a set of bearings 302 or bushings. Alternatively, a pin may be used to connect the at least one articulating arm 104, 106 to the pivot points of the mounting bracket 108 or the articulating bracket 112. The pin may be configured to allow the at least one articulating arm 104, 106 to rotate.

The mounting bracket 108 secures the articulating storage system 100 to a surface. The mounting bracket 108 may comprise any suitable device or system for securing the articulating storage system 100 in a desired location. In one embodiment, the mounting bracket 108 may comprise a mounting system suitably configured to allow the at least one articulating arm 104, 106 to be selectively coupled, connected, or otherwise attached to a surface such as an underside of a vehicle dashboard, glare screen, instrument panel, fire panel, seat, cabinet, desk, or the like.

Referring now to FIGS. 6 and 11-13, in one embodiment, the mounting bracket 108 may comprise a plate having a base portion 602 and a downwardly-depending side member 604. The base portion 1102 may be configured to be connected to an underside of a dashboard in a vehicle. The side member 1104 may depend downward in a substantially vertical manner to provide a substantially planar surface that the at least one articulating arm 104, 106 may be connected to and rotate about. The side member 1104 may comprise one or more pivot points 1302, 1304 that are configured to be connect to the at least one articulating arm 104, 106.

The at least one articulating arm 104, 106 may be moved between the first and second positions by any suitable system or method. For example, referring now to FIGS. 4A-6, an electric motor 402 may be coupled to the mounting bracket 108 and engage at least one of the articulating arms 104, 106. The electric motor 402 may be suitably adapted to selectively move the articulating arms 104, 106 from the first position to the second position and back again.

The electric motor 402 may comprise any suitable system or device for providing rotary motion to the connected articulating arm. For example, the electric motor 402 may comprise a servo, servomotor, rotary actuator, rotary motor, and the like. The electric motor 402 may be activated by any suitable method such as a switch, button, or wireless signal. The user may selectively activate the switch 404 causing the housing 102 to move from the first position to the second position. If the user activates the switch a second time, the housing 102 may be moved back to the first position.

Figure 4A:
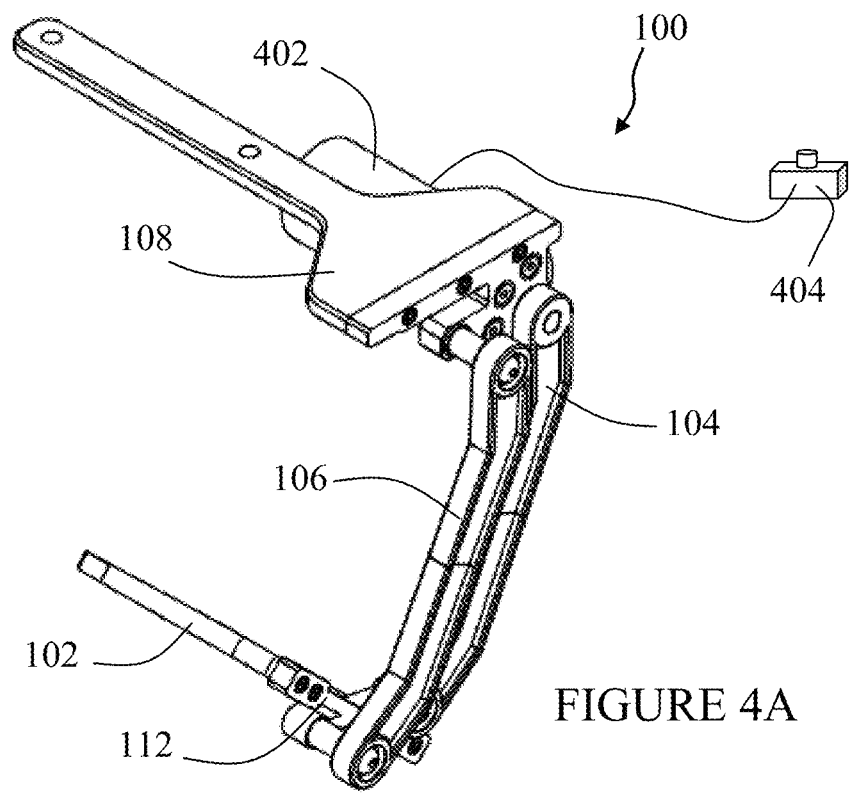
FIG. 4A representatively illustrates a perspective view of an alternate embodiment of the articulating storage device in accordance with an exemplary embodiment of the present technology.
Figure 4B:
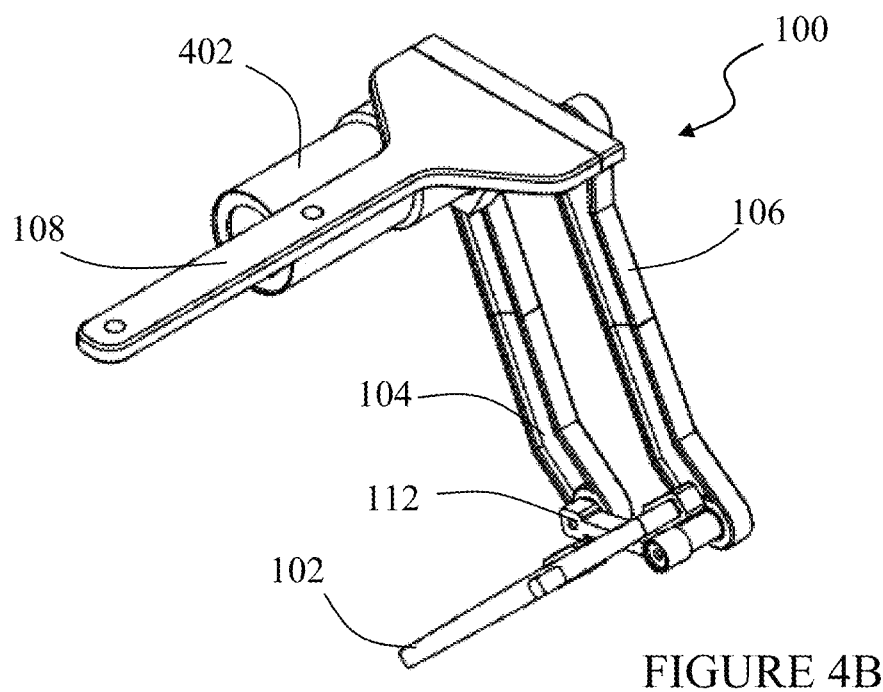
FIG. 4B representatively illustrates a second perspective view of the alternate embodiment of the articulating storage device in accordance with an exemplary embodiment of the present technology.
Figure 5:
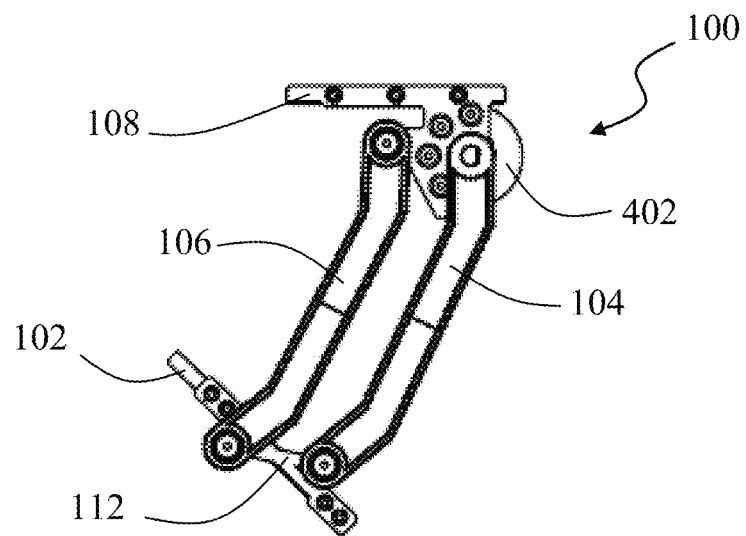
FIG. 5 representatively illustrates a side view of the alternate embodiment of the articulating bracket in accordance with an exemplary embodiment of the present technology.
Figure 6:
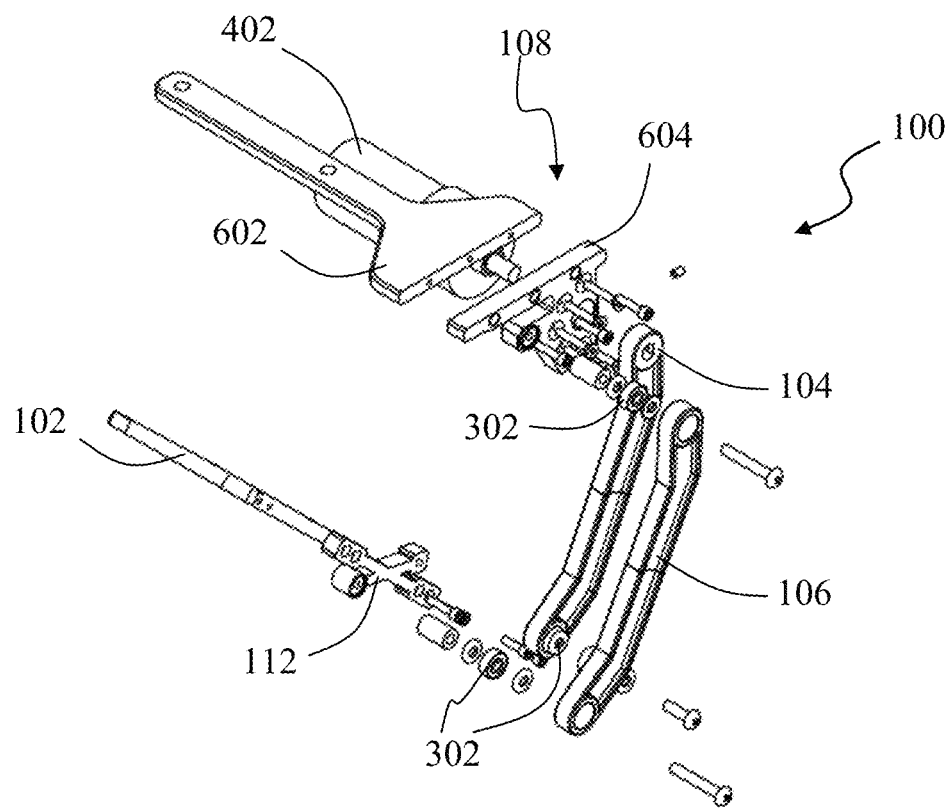
FIG. 6 representatively illustrates an exploded view of the alternate embodiment of the articulating storage device in accordance with an exemplary embodiment of the present technology.

Referring now to FIG. 4A, in one embodiment, a switch 404 may be positioned at a remote location from the articulating storage system 100 to allow a user to activate the electric motor 402 from a desired location. For example, the switch 404 may be located on a floor, door panel, dashboard surface, or center console of a vehicle. The switch 404 may be positioned at a visible location or the switch 404 may be hidden from plain view to allow for additional concealment of the articulating storage system 100.

In an alternative embodiment, the switch 404 may comprise a wireless transmitter configured to transmit an activation signal to the electric motor 402 causing the electric motor 402 to move the at least one articulating arm 104, 106 to a desired position. In yet another embodiment, the switch 404 may comprise a biometric sensor configured to detect biometric characteristics of a user. For example, the biometric sensor may comprise a fingerprint scanner suitably configured to read a user's fingerprint and to transmit an activation signal to the electric motor 402 only if the scanned fingerprint corresponds to a stored or otherwise authorized fingerprint of a user.

Alternatively, the articulating arms 104, 106 may be moved by a pneumatic or hydraulic system that may or may not require the use of electricity. In yet a third embodiment, a spring may be coupled to the mounting bracket 108 and the articulating arms 104, 106. The spring may be suitably configured to move the articulating arms 104, 106 between the first and second position. For example, the housing 102 may be held in the first position by a clamp or locking tab (not shown) linked to the switch 404 located away from the articulating storage system 100. The user may activate the switch 404 and release the clamp or locking tab to free the housing. The spring force may then be allowed to act on the articulating arms 104, 106 to move the housing 102 to the second position. To reposition the housing 102 to the first position, the user may manually move the housing 102 back to the first position to engage the clamp or locking tab.

Figure 7C:
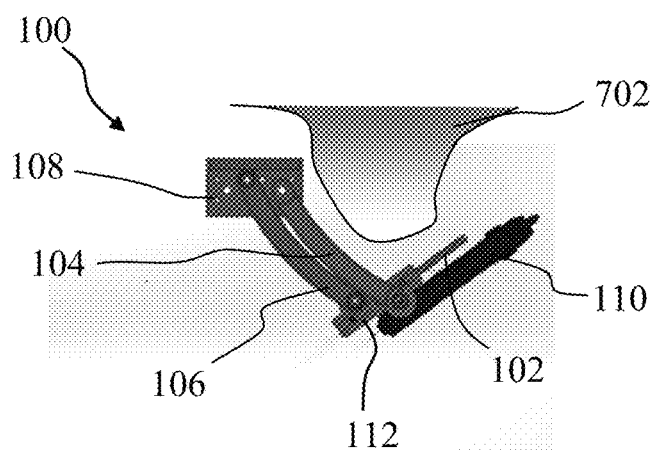
FIG. 7C representatively illustrates the articulating storage device in an extended position in accordance with an exemplary embodiment of the present technology.
Figure 8:
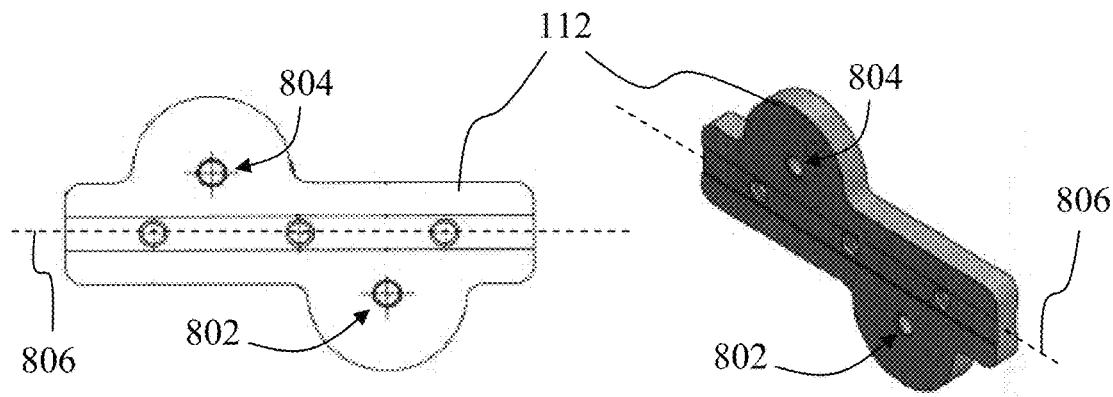
FIG. 8 representatively illustrates side and perspective views of an articulating bracket in accordance with an exemplary embodiment of the present technology.

Referring again to FIGS. 7A-7C, in operation, the articulating storage system 100 may be suitably configured to position the housing 102 in a first position concealed under a lower dashboard panel 702 (FIG. 7A). On a user's command, the articulating storage system 100 may reposition the housing 102 from the first position to a second position that is out of concealment so that the device 110 may be accessed. Referring now to FIG. 7B, a user may activate or command the articulating storage system 100 to reveal the device 110 causing the at least one articulating arm 104, 106 to begin moving from the first position to the second position. In one embodiment, this articulation may move the housing 102 from behind the lower dashboard panel upwardly and away from the lower dashboard panel 702 and towards the user. Referring now to FIG. 7C, once the at least one articulating arm 104, 106 has completed its motion, the housing 102 may be positioned at least partially in front of the lower dashboard panel 702 where the user may easily reach and take possession of the device 110. On command, the articulating storage system 100 may reposition the at least one articulating arm 104, 106 back to the first position to conceal the housing 102.

The particular implementations shown and described are illustrative of the technology and its best mode and are not intended to otherwise limit the scope of the present technology in any way. For the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the technology has been described with reference to specific exemplary embodiments. Various modifications and changes may be made, however, without departing from the scope of the present technology as set forth in the claims. The specification and figures are illustrative, rather than restrictive, and modifications are intended to be included within the scope of the present technology. Accordingly, the scope of the technology should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The invention claimed is:

1. An articulating storage system for a gun, comprising:
   a holster comprising a receiving portion configured to receive at least a portion of the gun;
   an articulating bracket coupled to the holster, wherein the bracket comprises a first pivot point and a second pivot point;
   a first arm having a first end and a second end, wherein the first end is pivotally connected to the first pivot point;
   a second arm having a first end and a second end, wherein the first end is pivotally connected to the second pivot point; and
   a mounting bracket configured to:
      pivotally couple to the second end of the first arm at a third pivot point;
      pivotally couple to the second end of the second arm at a fourth pivot point; and
   a rotary actuator connected to at least one of the first arm and the second arm, wherein the rotary actuator is configured to rotate the connected arm about its respective pivot point on the articulating bracket between a first position and a second position.

2. The articulating storage system of claim 1, wherein the holster further comprises a lock configured to:
   prevent removal of the gun from the receiving portion when the first arm is in the first position; and
   allow the gun to be removed from the receiving portion when the first arm is in the second position.

3. The articulating storage system of claim 2, wherein the lock comprises a fingerprint scanner configured to read a fingerprint and compare it against an authorized fingerprint before unlocking the receiving portion.

4. The articulating storage system of claim 1, wherein the articulating bracket is coupled to a side portion of the holster, wherein:
   the first pivot point is positioned proximate a first end portion of the articulating bracket and on a first side of a center line of the articulating bracket; and
   the second pivot point is positioned proximate a second end portion of the bracket and on a second side of the center line.

5. The articulating storage system of claim 1, wherein the first arm and the second arm pivot independently of each other to allow the holster to change orientation relative to the first and second arms as the first arm and the second arm translate from the first position to the second position.

6. The articulating storage system of claim 5, wherein the first arm comprises:
   a right-angled leg attachment section at the first end;
   a second right-angled leg attachment section at the second end; and
   a center portion configured to allow at least a portion of the second arm to pass when the first arm and the second arm translate from the first position to the second position.

7. The articulating storage system of claim 1, further comprising an activation switch configured to activate the rotary actuator.

8. The articulating storage system of claim 7, further comprising a wireless receiver coupled to the rotary actuator and responsive to a wireless signal transmitted by the activation switch.

9. The articulating storage system of claim 7, wherein the activation switch comprises a fingerprint scanner positioned remotely from the articulating storage system.

10. The articulating storage system of claim 1, wherein the rotary actuator comprises a servo motor.

11. An articulating storage system for a gun, comprising:
    a mounting bracket having a base portion and a downwardly-depending side member;

an articulating arm having a first end portion and a second end portion, wherein the first end portion of the articulating arm is pivotally connected to the downwardly-depending side member at a pivot point;

an articulating bracket pivotally connected to the second end portion of the articulating arm;

a rotary actuator connected to the articulating arm, wherein the rotary actuator is configured to rotate the articulating arm about the first pivot point from a first position and a second position; and a holster connected to the articulating bracket, wherein the holster comprises a receiving portion configured to receive at least a portion of the gun.

12. The articulating storage system of claim 11, further comprising a second articulating arm having a first end portion and a second end portions, wherein:

the first end portion of the second articulating arm is pivotally connected to the downwardly extending wall section at a second pivot point; and the second end portion of the second articulating arm is pivotally connected to the articulating bracket.

13. The articulating storage system of claim 12, wherein the articulating bracket is coupled to a side portion of the holster, wherein:

the first pivot point is positioned proximate a first end portion of the articulating bracket and on a first side of a center line of the articulating bracket; and the second pivot point is positioned proximate a second end portion of the articulating bracket and on a second side of the center line of the articulating bracket.

14. The articulating storage system of claim 12, wherein the first articulating arm and the second articulating arm pivot independently of each other to allow the holster to change orientation relative to the first articulating arm and the second articulating arm as the first articulating arm and the second articulating arm translate from the first position to the second position.

15. The articulating storage system of claim 14, wherein the first articulating arm comprises:

a right-angled leg attachment section at the first end;

a second right-angled leg attachment section at the second end; and a center portion forming a gap between the first and second right-angled leg attachments, wherein at least a portion of the second articulating arm may pass through the gap when the first articulating arm and the second articulating arm translate from the first position to the second position.

16. The articulating storage system of claim 11, wherein the holster further comprises a lock configured to:

prevent removal of the gun from the receiving portion when the first articulating arm is in the first position; and allow removal of the gun from the receiving portion when the first articulating arm is in the second position.

17. The articulating storage system of claim 16, wherein the lock comprises a fingerprint scanner configured to read a fingerprint and compare it against an authorized fingerprint before unlocking the receiving portion.

18. The articulating storage system of claim 11, further comprising an activation switch configured to activate the rotary actuator.

19. The articulating storage system of claim 18, further comprising a wireless receiver coupled to the rotary actuator and responsive to a wireless signal transmitted by the activation switch.

20. The articulating storage system of claim 18, wherein the activation switch comprises a fingerprint scanner positioned remotely from the articulating storage system, wherein the fingerprint scanner is configured to read a fingerprint and compare it against an authorized fingerprint before activating the rotary actuator.

* * * * *